United States Patent [19]
Singh

[11] Patent Number: 5,733,185
[45] Date of Patent: Mar. 31, 1998

US005733185A

[54] METHOD FOR REDUCING FECAL LEAKAGE AND CONTAMINATION DURING MEAT PROCESSING

[75] Inventor: Prem S. Singh, Glen Ellyn, Ill.

[73] Assignee: Swift-Eckrich, Inc., Downers Grove, Ill.

[21] Appl. No.: 608,295

[22] Filed: Feb. 28, 1996

[51] Int. Cl.[6] .......................................................... A22B 5/00
[52] U.S. Cl. .......................................................... 452/176
[58] Field of Search ................................................ 452/176

[56] References Cited

U.S. PATENT DOCUMENTS

| | | | |
|---|---|---|---|
| 3,712,304 | 1/1973 | Marsan | 128/283 |
| 4,465,702 | 8/1984 | Eastman | |
| 4,634,596 | 1/1987 | Eastman | |
| 4,739,539 | 4/1988 | Simmons | |
| 4,899,421 | 2/1990 | Van der Errden | |
| 4,992,539 | 2/1991 | Portnoy et al. | |
| 5,037,929 | 8/1991 | Rajagopalan et al. | |
| 5,057,157 | 10/1991 | Jane et al. | |
| 5,083,975 | 1/1992 | Neal et al. | 452/176 |
| 5,120,267 | 6/1992 | Neal et al. | 452/176 |
| 5,292,278 | 3/1994 | Neal et al. | 452/176 |
| 5,453,044 | 9/1995 | Abler et al. | 452/176 |
| 5,474,492 | 12/1995 | Aubert | 452/176 |
| 5,489,236 | 2/1996 | Neal et al. | 452/176 |
| 5,494,481 | 2/1996 | Anderberg | 452/176 |

*Primary Examiner*—Willis Little
*Attorney, Agent, or Firm*—Pretty, Schroeder & Poplawski

[57] ABSTRACT

Disclosed is a method for processing live animals into meat food products involving slaughtering the animal, inserting a gelled or a gellable material into the rectum of the slaughtered animal to form a plug obstructing the rectum, and then eviscerating the animal. The method can be integrated into automatic or semi-automatic processes for processing a live animal in order to substantially reduce fecal leakage and contamination.

41 Claims, No Drawings

METHOD FOR REDUCING FECAL LEAKAGE AND CONTAMINATION DURING MEAT PROCESSING

BACKGROUND OF THE INVENTION

1. Field of the Invention

The present invention relates to the field of animal processing to provide meat food products. More specifically, it relates to methods for reducing leakage of and contamination by matter from the rectum vent of an animal by obstructing the rectum vent.

2. Discussion of the Related Art

Public attention has recently been focused on the microbiological safety of commercially processed meat. Although this country's meat supply has remained consistently safe for many years, with a low incidence of microbial contamination causing illness, governmental agencies responsible for regulation and on-site inspection of commercial meat processing appear to be moving towards a policy of zero tolerance for microbial contamination. Accordingly, sources of contamination, including sources of food-borne pathogens and food-spoilage microbes, and the effects of current processing on contamination have come under scrutiny.

Generally, the origin of microbial contamination in raw meat, such as raw poultry, is the live animal; not the processing facility. The number of microbes found in a retail product is heavily influenced by the microbiological condition of the live animal, which is usually reared in close proximity with many of its kind, making transmission of potentially pathogenic and spoilage microorganisms possible.

The fecal micro flora of animals for slaughter is by far the predominant source of zoonotic microbes such as Campylobacter and Salmonella. Therefore, it is a desideratum for an effective method for reducing gross fecal leakage and contamination during processing.

Modern commercial animal processing generally is a multi-step process employing semi-automated apparatus for transporting an animal sequentially through different stations at high rates. The processing stations are, preferably, physically isolated from one another to minimize contamination from human sources and cross-contamination between stations. For example, after arriving at a processing plant, poultry are hung by their feet, stunned and then transported through a number of work stations ending with a cleaned carcass being cut into parts suitable for cooking or with the entire carcass being preserved for cooking.

More particularly, in modern, semi-automated, commercial processing plants, poultry is conveyed through a plurality of consecutive work stations or areas at speeds of about seventy birds per minute. Typically, the work stations include a slaughtering station where the throat of an invertedly suspended bird is cut and blood is permitted to drain; a scalding station, where the carcass is submerged in heated water to facilitate de-feathering; a de-feathering station, where spinning rubber fingers impact the outside of the carcass to remove the feathers; a washing station, where the exterior of the bird is washed by spraying with an unheated aqueous solution; a hock-cutting station where the feet are removed; and an evisceration station where the internal organs are removed from the remainder of the carcass.

Various measures have been put into place to avoid contamination and cross-contamination of meats during processing and to eliminate microbes introduced by the live animal. However, microbe-free meats have not yet been achieved, a long standing problem being the contamination and cross-contamination of poultry and other meats by the leakage of fecal materials from the rectum vent of the animal during processing.

For example, the de-feathering step can be a major source of contamination of poultry carcasses. As the spinning rubber fingers move from one carcass to another, they may spread fecal material leaked from a few carcasses to many carcasses.

Another step that can be a major source of contamination is evisceration. During evisceration the digestive tract organs are sometimes cut or otherwise opened so that ingesta or fecal material or other contents of the intestine may be released.

One approach to the problem of fecal leakage is to remove fecal matter from the animal to be processed. For example, one method involves squeezing or kneading the large intestine and rectum or cloaca of a poultry animal to force any fecal material out from the poultry animal. This is usually done manually and cannot effectively be accomplished at a rate which is compatible with the desired rate of operation of the conveyors in modern poultry processing facilities.

Another example of this approach involves using a suction probe inserted into the vent of the poultry animal. Loose fecal matter within the vent is supposedly withdrawn by the suction applied to the probe. Suction probes have not been particularly satisfactory, however. The probes often cannot remove all the loose fecal material due to the absence of air within the vent to create an air flow for entraining the fecal matter into the suction probe. Efforts to overcome this problem by increasing the amount of suction can actually work to suck out part of the intestine itself, thereby, damaging the poultry animal and often causing fecal leakage instead of preventing it.

Another approach to the problem involves obstructing the opening of the rectum vent. For example, one method includes gluing the vent opening shut. Fecal matter within the vent is supposedly prevented from leaking out through the vent by the adhesive seal. Adhesives have not been particularly satisfactory, due to leakage resulting from, for example, incomplete seals or tearing of the vent opening or adjacent area of the intestine during processing of the carcass.

Another example of this second approach involves inserting neoprene balls into the rectum vent to supposedly block intestinal fluids from leaking. However, such balls have demonstrated themselves to be nonstationary during the subsequent processing of the carcasses. This has resulted in fecal leakage, contamination and cross-contamination of carcasses.

Still another example of this approach is taken with relatively large animals such as cows, pigs, and sheep. A circular cut generally circumscribing the vent opening is made in the carcass and the entire circumscribed vent area is pulled out, pulling a portion of the intestine through the vent cut. The dislodged intestine immediately adjacent the anus or vent opening tied with a string or other clamping means to prevent intestinal leakage during further process steps. One drawback to this approach is that it is only useful with relatively large carcasses. A second drawback is that, even when it is used, it is labor-intensive and not compatible with the desired rates of operation of conveyors used in automated or semi-automated processing facilities.

Therefore, it is a desideratum for a method for reducing fecal leakage and contamination that can simply and effectively be incorporated into the automated or semi-automated processing of slaughtered animals into meat food products. It is also a desideratum for a method that does not preliminarily require the removal or suction of fecal matter from the rectum or the tying of the intestine of the animals to be processed.

Thus, there remains a definite need for an effective method for reducing gross fecal leakage and contamination. There remains a further definite need for methods which may be integrated into modern meat processing facilities to provide reliable, safe and consistent prevention of fecal leakage and contamination. The present invention satisfies these and other needs and provides further related advantages.

SUMMARY OF THE INVENTION

Now in accordance with the invention, there has been found a method that can be integrated into automated or semi-automated processes for processing a live animal in order to substantially reduce fecal leakage and contamination. The method involves slaughtering the animal and then obstructing its rectum with a gelled material. In some embodiments, a plug of gelled material is inserted into the rectum. The plug can be coated with fine particles of an abrasive material, such as wet-milled corn bran, to increase the adhesion between the plug and the rectal wall. In other embodiments, a gellable material is inserted into the rectum of the slaughtered animal under conditions to gel the material to form the plug. Both embodiments are useful in the processing of cows, pigs, sheep and poultry, such as chickens, game hens, ostriches, ducks and turkeys. The rectum is preferably obstructed early during processing and, when the animal is a poultry animal, it is most preferably obstructed before the poultry carcass is scalded and de-feathered.

In a preferred embodiment, the gelled plug is made by combining a cold water swelling granular starch with an aqueous sugar syrup. The gelled plug swells when it comes into contact with the slaughter animal's intestinal fluids forming an obstruction conforming to and having sufficient tack to create a seal with the rectal wall, thereby substantially preventing fecal leakage past the plug.

In some embodiments, the gelled plug contains a bore extending from the distal end through a portion of the plug. The bore reduces the back pressure caused by intestinal fluid and fecal material as the a plug is inserted into the animal's rectum. In preferred embodiments, when the slaughtered animal is a poultry animal, the distal end of the plug is positioned from about 2.5 cm to about 8 cm from the slaughtered animal's rectum vent.

Further, there has been found a pre-eviscerated animal carcass having a plug of gelled material in its rectum conforming to and forming a seal with the rectal wall to form an obstruction that substantially prevents fecal leakage. Still further, there has been found an apparatus for processing a live poultry animal, the apparatus having a slaughtering station for providing a slaughtered carcass, an insertion station for inserting a gelled plug or a gellable material into the rectum of the slaughtered carcass, a scalding station for submerging the carcass in heated water, a de-feathering station for removing feathers from the carcass, and an evisceration station for removing the internal organs from the carcass.

DETAILED DESCRIPTION OF THE PREFERRED EMBODIMENTS

The following description may concentrate primarily on the processing of poultry, such as chickens and turkeys, into meat food products to exemplify a multi-step processing operation. It should be readily apparent to the skilled artisan that the description with little or no modification might also apply to processing of other animals, including those animals which are sources for other meat food products such as, for example, beef, pork, lamb, veal and the like.

The method in accordance with the invention is useful during the processing of any animal having a rectum or cloaca and a vent. Representative animals include cows, pigs, sheep and poultry, such as chickens, game hens, ostriches, ducks, and turkeys. The method has been found particularly effective in substantially reducing fecal leakage and contamination from poultry.

In accordance with the inventive method, the rectum is plugged by inserting a gelled or a gellable material through an animal's rectum vent and into its rectum. In those embodiments, where a plug of gelled material is inserted into the rectum, the plug is made from any gelled material that is compressible, i.e., can be squeezed through the rectum vent and is swellable and resilient, i.e., after insertion expands to conform to and create a seal with the mucosal surface of the rectal wall and then maintain the seal. Additionally, the material has sufficient tack, so that once the plug is in place, it is not dislodged during the subsequent processing of the animal.

In some embodiments, the plug is coated with fine particles of an abrasive material to increase the adhesion between the plug and the rectal wall. The material can be any material that is compatible with preparing an edible food product. Representative food-compatible, abrasive materials include wet-milled corn bran.

The gelled plug is of any shape at least a portion of which has a substantially circular cross section. Representative shapes include cylinders, spheres, cones and frustrums, with cylinders being preferred. The specific dimensions will depend on the particular animal to be processed and will be readily determinable by one skilled in the art.

In some embodiments, the plug contains a bore extending from the distal end through a portion of the plug. Upon insertion into the rectum, intestinal fluid and fecal material can fill the bore, this reducing back-pressure on the plug and enhancing its positional stability.

It is an advantage of this embodiment that the insertion step is readily incorporated into conventional, semi-automated processing lines. In some embodiments, the gelled plug is inserted at a fully automated insertion station. In other embodiments, the gelled plug is manually inserted at an insertion station using a rounded, plastic, tampon dispenser-type mechanism. The plug is advantageously inserted any time after the animal has been slaughtered or stunned and before it is eviscerated. To minimize fecal leakage and contamination, the plug is preferably inserted during one of the initial processing steps.

Upon insertion, the intestinal fluids contact the plug causing it to swell, typically increasing the diameter of the plug from about 0.3 cm to about 2.25 cm. The swollen plug blocks the lumen of the distal colon, thus preventing the escape of fecal matter. Typical dimensions are set forth in the following table:

| Animal | Diameter(cm) | Length(cm) |
| --- | --- | --- |
| Chicken | .25–1.5 | 1–3 |
| Game Hen | .25–1.5 | 1–3 |

-continued

| Animal | Diameter(cm) | Length(cm) |
| --- | --- | --- |
| Duck | .3–2 | 1–4 |
| Turkey | .3–2.25 | 1–5 |
| Cow | 10–15 | 13–20 |
| Sheep | 5–9 | 10–15 |
| Pig | 5–9 | 10–15 |

In those embodiments, where a sufficient amount of a gellable material is inserted into the rectum of the slaughtered animal under conditions to gel the material and form a plug, the gellable material is any material that gels when combined with water or other suitable liquid to form a plug that swells (or hydrates) when it comes into contact with intestinal fluids present in the rectum. The swollen plug conforms to and has sufficient tack to create a seal with the rectal wall that is not dislodged during subsequent processing of the animal.

For ease of use in high speed, automated or semi-automated processing plants, the material should gel within a period of less than about one minute, preferably within a period of from about five to fifteen seconds. Furthermore, it is desirable that the material gel without chilling or without heating the water or other suitable liquid to its boiling point. It is preferable that the material gel at temperatures of from about 100° to about 170° F., more preferably from about 105° to about 108° F.

It is also an advantage of the second embodiment that the insertion step is readily incorporated into automated or semi-automated processing lines. The gellable material is manually inserted at an insertion station using a big barrel syringe. For example, a cold water swelling starch is combined with an aqueous sugar syrup in the syringe and then injected into the rectum of the slaughtered animal. The mixture rapidly gels and swells to form a plug conforming to and forming a seal with the rectal wall.

Representative materials for use in both embodiments include starches, such as cold-water-swelling or pregelatinized starches, and gums, such as agar, gelatin, low methoxyl pectin and carrageenan gums. Cold-water swelling starches are preferred. Exemplary cold-water-swelling starches are granular starches that have been subjected to an alcohol process, as described in Eastman, U.S. Pat. No. 4,465,702 (which patent is herein incorporated by reference), or further modified by substitution, crosslinking or oxidation. Common reagents for substitution are propylene oxide and acetic anhydride and common cross-linking agents are phosphorous oxychloride and adipic acid. Such starches typically have a gel-forming capability represented by a gel strength of greater than about 90 grams, as measured by the Voland Stevens method at room temperature. Preferred examples of such starches include MIRA-GEL 463, Soft Set and MIRA-THIK 468 and 469 which are available from A. E. Staley Co., Inc. MIRA-GEL 463 is most preferred.

The rectum is advantageously obstructed any time after the animal has been slaughtered or stunned and before it is eviscerated. To minimize fecal leakage and contamination, the gelled plug or the gellable material are preferably inserted as one of the initial processing steps. When processing poultry, the insertion step most preferably occurs after stunning and bleeding, but before the animals have been scalded. The depth of insertion of the plug into the rectum of a particular animal is dependent on the animal to be processed and will be readily determinable by one skilled in the art. With turkey, for example, the plug is preferably inserted so that the distal end is positioned from about 2.5 cm to 8 cm from the rectum vent. It is a benefit of the method in accordance with the invention that fecal leakage and contamination can be substantially reduced or eliminated without having to vacuum or suction the rectum or tie the intestine.

A determination of whether an effective seal has been formed can be pre-tested by manually squeezing the rectum of the animal being processed so that gases or material contained therein press against the seal. By varying the squeeze pressure, one can qualitatively determine that the plug can withstand a considerable buildup of back pressure before becoming dislodged or before permitting leakage of fecal material from the vent.

Once the plug has formed, the animal carcass continues along the processing line. After evisceration, the plug is discarded along with the intestine.

While the invention has been described in detail with reference to certain preferred embodiments thereof, it will be understood that modifications and variations are within the spirit and scope of that which is described and claimed.

That which is claimed is:

1. A method for processing a live animal to provide a meat food product comprising:
   slaughtering an animal;
   inserting a plug of a gelled material into the rectum of the slaughtered animal;
   causing the plug to come into contact with intestinal fluids after insertion into the rectum, to cause the plug to swell so as to conform to and form a seal with the rectal wall and to obstruct the rectum and substantially prevent fecal leakage past the plug; and then
   eviscerating the animal.

2. The method in accordance with claim 1, wherein the animal is selected from cows, pigs, sheep and poultry.

3. The method in accordance with claim 1, wherein the animal is selected from chickens, game hens, ostriches, ducks and turkey.

4. The method in accordance with claim 3, wherein the plug is cylindrical in shape and upon swelling has a width of from about 0.25 cm to about 2.25 cm and a length of from about 1 cm to about 5 cm.

5. The method in accordance with claim 3, further comprising scalding, and de-feathering the slaughtered animal after inserting the plug.

6. The method in accordance with claim 1, wherein the animal is a turkey.

7. The method in accordance with claim 6, wherein the gelled material is formed from a cold-water-swelling starch or a pregelatinized starch.

8. The method in accordance with claim 6, wherein the gelled material is formed from a cold-water-swelling starch combined with an aqueous sugar syrup.

9. The method in accordance with claim 6, wherein the plug is cylindrical in shape and upon swelling has a width of from about 0.3 cm to about 2.25 cm and a length of from about 1 cm to about 5 cm.

10. The method in accordance with claim 1, wherein the gelled material is formed from a cold-water-swelling starch combined with an aqueous sugar syrup.

11. The method in accordance with claim 1, wherein the plug is cylindrical in shape.

12. The method in accordance with claim 1, further comprising the plug contains a bore extending from the distal end through a portion of the plug.

13. The method in accordance with claim 1, further comprising the plug is coated with a food-compatible, abrasive material to increase adhesion between the plug and the rectum's wall.

14. The method in accordance with claim 13, wherein the food-compatible, abrasive material is wet-milled corn bran.

15. The method in accordance with claim 1 wherein the gellable material is a cold-water-swelling starch or a pregelatinized starch.

16. A method for processing a live animal to provide a meat food product comprising:

slaughtering an animal, inserting a plug of a gelled material formed from a cold-water-swelling starch or a pregelatinized starch into the rectum of the slaughtered animal to obstruct the rectum and substantially prevent fecal leakage past the plug; and then eviscerating the animal.

17. A method for processing a live turkey to provide a meat food product comprising:

slaughtering a turkey;

inserting a plug of a gelled material into the rectum of the slaughtered turkey, so that after insertion the distal end of the plug is positioned from about 2.5 cm to about 8 cm from the rectum vent;

causing the plug to come into contact with intestinal fluids after insertion into the rectum, to cause the plug to swell and to obstruct the rectum and prevent fecal leakage past the plug; and then eviscerating the turkey.

18. The method in accordance with claim 10, further comprising the plug contains a bore extending from the distal end through a portion of the plug.

19. A method for processing live poultry to provide a meat food product comprising:

slaughtering a poultry animal;

inserting a plug of a gelled material into the rectum of the slaughtered poultry animal, so that the distal end of the plug is positioned from about 2.5 cm to about 8 cm from the rectum vent;

causing the plug to come into contact with intestinal fluids after insertion into the rectum, to cause the plug to swell and to obstruct the rectum and prevent fecal leakage past the plug;

scalding the slaughtered poultry animal;

de-feathering the scalded poultry animal; and then eviscerating the de-feathered poultry animal.

20. The method in accordance with claim 18, wherein the gelled material is formed from a cold-water-swelling starch combined with an aqueous sugar syrup.

21. A method for processing a live animal to provide a meat food product comprising:

slaughtering an animal:

inserting a gellable material into the rectum of the slaughtered animal under conditions to gel the material and form a plug that swells and conforms to and forms a seal with the rectal wall to obstruct the rectum, thereby substantially preventing fecal leakage past the plug; and then eviscerating the animal.

22. The method in accordance with claim 21, wherein the animal is selected from cows, pigs, sheep and poultry.

23. The method in accordance with claim 21, wherein the animal is selected from chickens, game hens, ostriches, ducks and turkey.

24. The method in accordance with claim 21, wherein the animal is a turkey.

25. The method in accordance with claim 24, wherein the gellable material is a cold-water-swelling starch that is combined with an aqueous sugar syrup to gel the material and to form the plug obstructing the rectum.

26. The method in accordance with claim 25, wherein the material is inserted at a temperature of from about 105° to about 108° F.

27. The method in accordance with claim 25, wherein the material gels within a period of from about five to about fifteen seconds after insertion into the rectum.

28. The method in accordance with claim 25, wherein the material gels within a period of from about five to about fifteen seconds after insertion into the rectum.

29. The method in accordance with claim 24 wherein the gellable material is a cold-water-swelling starch or a pregelatinized starch.

30. The method in accordance with claim 21, wherein the gellable material is a cold-water-swelling starch that is combined with an aqueous sugar syrup to gel the material and to form the plug obstructing the rectum.

31. The method in accordance with claim 21, wherein the material inserted at a temperature of from about 100° to about 120° F.

32. The method in accordance with claim 21, wherein the material gels within a period of less than about one minute after insertion into the rectum.

33. The method in accordance with claim 21, wherein the material gels within a period of less than about one minute after insertion into the rectum.

34. A method for processing a live poultry animal to provide a meat food product comprising:

slaughtering the poultry animal;

inserting a combination of a cold-water-swellable starch and an aqueous sugar syrup into the rectum of the slaughtered poultry animal;

gelling the starch to form a plug that conforms to and forms a seal with the rectal wall, thereby obstructing the rectum and substantially preventing fecal leakage past the plug;

scalding the slaughtered poultry animal;

de-feathering the scalded poultry animal; and then eviscerating the animal.

35. The pre-eviscerated animal of claim 34, wherein the gelled material is a cold-water-swelling starch.

36. A pre-eviscerated animal comprising a slaughtered animal carcass having a plug of gelled material formed of a cold-water-swelling starch or a pregelatinized starch in the rectum of the slaughtered animal forming an obstruction in the rectum and substantially preventing fecal leakage past the plug.

37. The pre-eviscerated animal in accordance with claim 36, wherein the animal is selected from cows, pigs, sheep and poultry.

38. The pre-eviscerated animal in accordance with claim 36, wherein the animal is selected from chickens, game hens, ostriches, ducks and turkey.

39. The pre-eviscerated animal in accordance with claim 36, wherein the animal is a turkey.

40. The pre-eviscerated animal of claim 39, wherein the gelled material is a cold-water-swelling starch or a pregelatinized starch.

41. The pre-eviscerated animal of claim 39, wherein the gelled material is a cold-water-swelling starch.

* * * * *